(12) United States Patent
Wang et al.

(10) Patent No.: US 8,385,178 B2
(45) Date of Patent: Feb. 26, 2013

(54) MULTI-STAGE FOCUS ACTUATOR AND OPTICAL HEAD

(75) Inventors: Xeufeng Wang, Schenectady, NY (US); John Erik Hershey, Ballston Lake, NY (US); Zhiyuan Ren, Malta, NY (US); Xiaohong Li, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/977,412

(22) Filed: Dec. 23, 2010

(65) Prior Publication Data

US 2012/0163140 A1 Jun. 28, 2012

(51) Int. Cl.
*G11B 7/00* (2006.01)
(52) U.S. Cl. ............... 369/103; 369/94; 369/44.14
(58) Field of Classification Search .......... 369/103, 369/94, 44.11, 44.27, 44.19, 44.32, 53.19, 369/44.14, 44.28
See application file for complete search history.

(56) References Cited

U.S. PATENT DOCUMENTS

| | | | | |
|---|---|---|---|---|
| 4,264,986 A * | 4/1981 | Willis | ............................ | 365/124 |
| 6,614,741 B1 * | 9/2003 | Hesselink et al. | ............ | 369/103 |
| 2007/0177469 A1 * | 8/2007 | Imagawa | .................. | 369/112.01 |
| 2008/0144455 A1 * | 6/2008 | Sasaki | ......................... | 369/47.15 |
| 2008/0239922 A1 * | 10/2008 | Fujita et al. | ................... | 369/103 |
| 2009/0003183 A1 | 1/2009 | Miyamoto et al. | | |
| 2009/0034378 A1 * | 2/2009 | Wu et al. | .......................... | 369/94 |
| 2009/0116088 A1 * | 5/2009 | Okada et al. | ..................... | 359/26 |
| 2010/0053710 A1 * | 3/2010 | Bae et al. | ........................... | 359/3 |
| 2010/0157774 A1 * | 6/2010 | Ren et al. | ....................... | 369/103 |
| 2010/0165817 A1 * | 7/2010 | Shi et al. | ......................... | 369/103 |
| 2010/0165818 A1 * | 7/2010 | Ostroverkhov et al. | ...... | 369/103 |

FOREIGN PATENT DOCUMENTS

| EP | 2164068 A2 | 3/2010 |
|---|---|---|
| EP | 2182514 A2 | 5/2010 |
| EP | 2182515 A1 | 5/2010 |

OTHER PUBLICATIONS

IPO Search Report dated Mar. 30, 2012; GB1121543.1; pp. 1-4.
Wu, Mingching et al.; "Development of Tracking and Focusing Micro Actuators for Dual-Stage Optical Pick-Up Head," J. Opt. A:Pure and Applied Optics, vol. 8, 2006, pp. 8323-8329.

\* cited by examiner

*Primary Examiner* — Thang Tran
(74) *Attorney, Agent, or Firm* — Jean Testa; Fletcher Yoder

(57) ABSTRACT

Techniques are provided for using a multi-stage actuator to actuate one or more optical components of an optical head. The multi-stage actuator includes a cross-layer displacement component which actuates an optical component to change the beam focus in a displacement range corresponding to the thickness of the data layers in a holographic disk, such that a beam is impinged on the target data layer. The multi-stage actuator also includes a intra-layer focusing component which actuates the optical component in a smaller range to focus the beam on the target data position. The cross-layer displacement component and the intra-layer focusing component may each include more than one actuator. In some embodiments, the focusing component also actuates the optical component in a tilting motion to compensate for movement or imperfections of the disk during a reading or recording process.

23 Claims, 3 Drawing Sheets

MULTI-STAGE FOCUS ACTUATOR AND OPTICAL HEAD

BACKGROUND

The present techniques relate generally to bit-wise holographic data storage techniques. More specifically, the techniques relate to methods and systems for holographic reading and/or recording.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disc, developed in the early 1980s, has a capacity of around 650-700 MB of data, or around 74-80 minutes of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. Holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. Some configurations of holographic storage disks involve storing micro-holograms in multiple data layers, each having multiple parallel data tracks. However, such high storage densities in holographic storage systems may involve a higher amount of precision in positioning an optical head for reading and/or recording processes, as certain processes may involve positioning the optical head to focus on one of several data layers in the disk. Furthermore, such precise positioning may take a greater amount of time, thereby slowing a reading or recording process. Techniques for increasing the efficiency of reading and/or recording on multi-layer holographic storage systems are desired.

BRIEF DESCRIPTION

An embodiment of the present techniques provides a method of focusing a beam to a holographic disk. The method includes determining a target data position on a target data layer in the holographic disk and actuating one or more optical components using a first component of a multi-stage actuator and using a second component of the multi-stage actuator. The first component is configured to actuate the one or more optical components to change a focus depth of a beam in a range corresponding to a thickness of data layers in the holographic disk, such that the beam is impinged on the target data layer while the second component is configured to actuate the one or more components to focus the beam on the target data position.

Another embodiment provides an optical head for holographic disk reading and recording. The optical head includes one or more optical components, where the optical head is configured to impinge a beam on a target data position in a target data layer of a holographic disk. The system further includes a multi-stage actuator including a cross-layer component and an intra-layer component. The cross-layer component is configured to actuate at least one of the one or more optical components to change a focus depth of the beam in a range corresponding to a total thickness of the plurality of data layers to impinge the beam on the target data layer, and the intra-layer component is configured to actuate at least one of the one or more optical components to focus the beam on the target data position.

Yet another embodiment provides a system including a multi-stage actuator. The multi-stage actuator includes a cross-layer displacement component configured to actuate one or more optical components in an optical head in a first range to impinge the beam on a data layer of a disk and an intra-layer focusing component configured to actuate the one or more optical components in a second range to focus the beam on a data position in the data layer, where the first range is larger than the second range.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
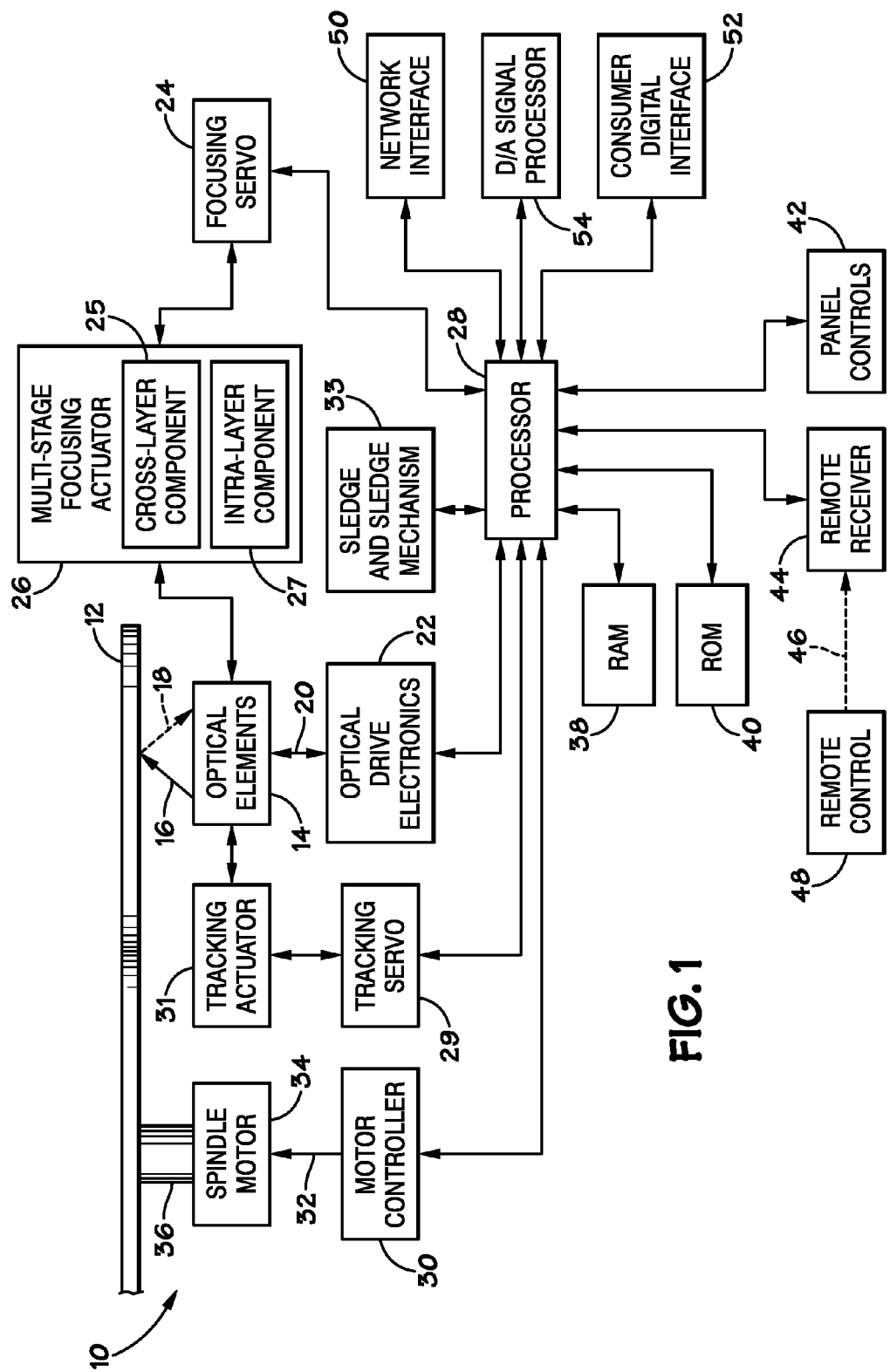
FIG. 1 is a block diagram of a holographic storage system, in accordance with embodiments.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Data in a holographic storage system is stored within a photosensitive optical material using an optical interference pattern that allows data bits to be stored throughout the volume of the optical material. Holographic storage systems may be configured for multilayer storage, which involves storing holographic data in multiple layers of an optical disk, thus increasing storage capacity. To record data in a holographic storage system, a recording beam (e.g., a laser) may be directed to a particular depth in the media and focused on a target layer, or the layer on which data is to be recorded. The recording beam may further be focused on a target data position, or a position on one or more target layers on which data is to be recorded. The recording beam generates a photochemical change at the layer and/or data position where the laser is focused, writing the data. In some holographic storage disk configurations, the disk includes dye material in the writable portion of the substrate, and the recording beam converts the dye material into a micro-hologram. In other holographic storage configurations, the disk includes medium which may be modified by the recording beam to have diffraction gratings which may be altered to be indicative of a micro-hologram.

To read data in a multilayer holographic storage system, a reading beam may be directed to a data bit position (i.e., the target data position) at a particular layer (i.e., the target data layer) in a holographic disk, and the reading beam may pass through the surface of the holographic disk to interact with the material at the data bit position. The interaction of the reading beam at the target data layer may result in a scattering and/or reflecting of the reading beam from the data bit position in the holographic disk. The scattered and/or reflected portions of the reading beam may be referred to as a reflected reading beam or a returned reading beam and may be proportional to an initial recording beam that recorded the holographic data bit in the data bit position. As such, the reflected reading beam may be detected to reconstruct the data originally recorded in the data bit position on which the reading beam is impinged.

FIG. 1 provides a block diagram of a holographic storage system 10 that may be used to read data from holographic storage disks 12. The data stored on the holographic storage disk 12 is read by a series of optical elements 14, which may be suitable for emitting beams 16 (e.g., a reading beam or a recording beam) and receiving reflections 18 (e.g., including light scatter and/or reflection of the beams 16 by the medium of the disk 12) of the beams from the holographic storage disk 12. The optical elements 14 may include any number of different elements designed to generate excitation beams (e.g., lasers), or other elements such as an optical head configured to focus the beams 16 on the holographic storage disk 12 and/or detect the reflections 18 coming back from the holographic storage disk 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the holographic storage disk 12.

The location of the optical elements 14 over the holographic storage disk 12 is controlled by a focusing servo 24 which has an actuator 26 configured to move the optical elements in a vertical or perpendicular direction (also referred to herein as a z-direction) with respect to the surface of the holographic storage disk 12. The actuator 26 may have multiple stages and may also be referred to as a multi-stage actuator 26. For example, in some embodiments, the multi-stage actuator 26 may include a cross-layer component 25 configured to move optical elements in relatively larger or coarser movements and an intra-layer component 27 configured to move optical elements in relatively smaller or finer movements. As will be discussed the cross-layer and intra-layer stages 25 and 27 may be suitable for layer displacement and focusing, respectively. In some embodiments, the holographic storage system 10 may have a tracking servo 29 and a tracking actuator 31 configured to move the optical elements in a horizontal or planar direction with respect to the surface of the disk 12. The tracking actuator 31 may also include a larger displacement component (e.g., for horizontal movement across several data tracks) and a smaller displacement component (e.g., for maintaining tracking on one target data track). In some embodiments, both the focusing servo and the tracking servo 29 may move the optical elements to maintain focusing and tracking during a reading and/or recording process of the disk 12.

The optical drive electronics 22 and the servos 24 and 29 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance, amplify, and/or reduce interferences of the reflected beam 18 or compensate for movement and/or imperfections of the holographic disk 12. In some embodiments, the servos 24 and 29 and/or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the holographic storage disk 12. In addition, the processor 28 may also control a sledge and sledging mechanism 33 that moves optical components such as the optical drive electronics 22, the optical elements 14, and the focusing and tracking actuators 24 and 31, in a direction parallel to the disk surface (planar or horizontal direction) to access data across the disk radius. As the optical elements 14 are moved from the outside edge of the holographic storage disk 12 closer to the spindle 36, the rotational speed of the optical data disk may be increased by the processor 28. This may be performed to keep the data rate of the data from the holographic storage disk 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the focus and tracking servo 24 and 31, optical drive electronics 22, motor controller 30, and sledge and sledge mechanisms 33. In some embodiments, the ROM 40 includes a look-up table including information corresponding to a reading beam impinged on the holographic disk 12. For example, the look-up table may include a suitable reading beam power for each data layer of the disk 12, as will be further discussed. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the holographic storage disk 12 into a data stream that may be used by other units.

If the holographic storage system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
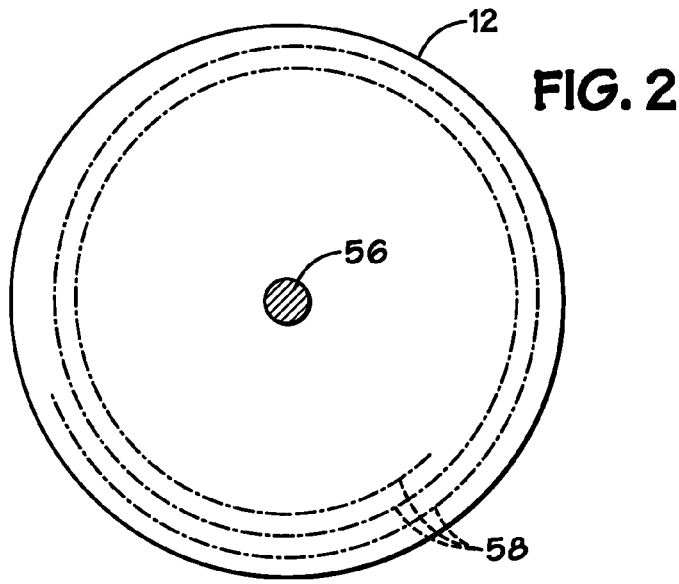
FIG. 2 illustrates a holographic disk having data tracks, in accordance with embodiments.
Figure 3:
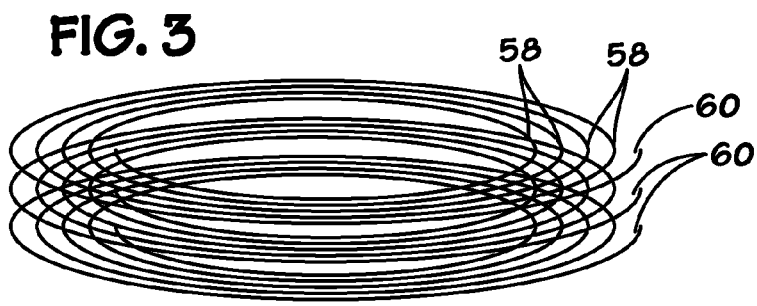
FIG. 3 illustrates multiple data layers of a holographic disk, in accordance with embodiments.

The system 10 may be used to read a holographic storage disk 12 containing data, as shown in FIG. 2. Generally, the holographic storage disk 12 is a flat, round disk with a recordable medium embedded in a transparent protective coating. The protective coating may be a transparent plastic, such as polycarbonate, polyacrylate, and the like. A spindle hole 56 of the disk 12 couples to the spindle (e.g., the spindle 36 of FIG. 1) to control the rotation speed of the disk 12. On each layer, data may be generally written in a sequential spiraling track 58 from the outer edge of the disk 12 to an inner limit, although circular tracks, or other configurations, may be used. The data layers may include any number of surfaces that may reflect light, such as the micro-holograms used for bit-wise holographic data storage or a reflective surface with pits and lands. An illustration of multiple data layers is provided in FIG. 3. Each of the multiple data layers 60 may have a sequential spiraling track 58. In some embodiments, a holographic disk 12 may have multiple (e.g., 40, 50) data layers 60 which may each be between approximately 0.05 µm to 5 µm in thickness and be separated by approximately 0.5 µm to 250 µm.

Figure 4:
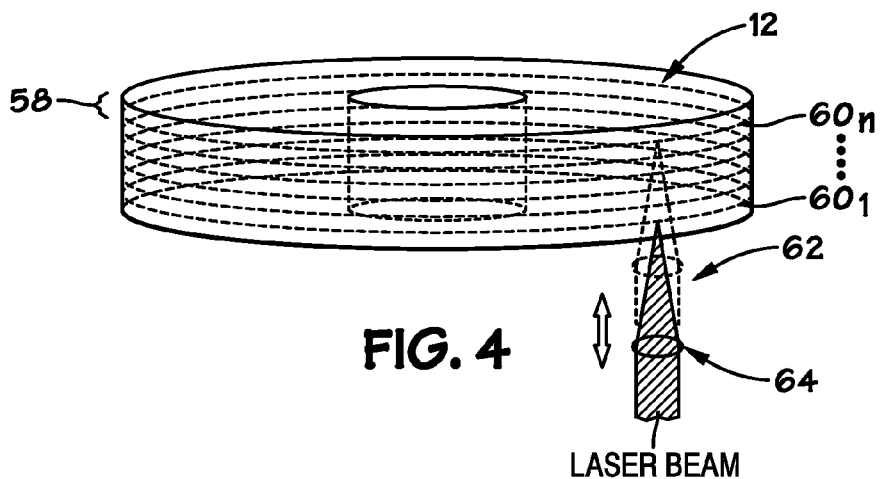
FIG. 4 represents an optical system for reading a holographic disk having multiple layers, in accordance with embodiments.

A reading or recording process in a holographic system may involve actuating optical components (e.g., one or more lenses in the optical elements 14 of FIG. 1) to focus the reading or recording beam on data positions and data layers 60 throughout the disk 12. FIG. 4 represents an optical system 62 for reading a holographic disk 12 having multiple layers 60 (e.g., $60_1$ and $60_n$). For example, the optical system 62 may include the optical elements 14 and optical drive electronics package 22 from the holographic system 10 of FIG. 1. The optical system 62 may include an objective lens 64 (e.g., a component in the optical elements 14) which may be moved to affect the impingement or focus of the reading or recording beam. To read a micro-hologram from or record a micro-hologram to a target data position on one of the n data layers, a component (e.g., the objective lens 64) of the optical system 62 may be displaced such that the reading beam or recording beam is focused on the target data position (e.g., approximately 10-100 nm) throughout the distance of the n data layers (e.g., approximately 1-2 mm).

Typical actuation techniques for optical disc storage systems may involve using focusing and tracking voice coil actuators (in the focusing actuator 26 and the tracking actuator 31) to actuate the appropriate optical components to be positioned and focused on the target data layer and target data position. In conventional optical data storage media, such as CD, DVD, and Blu-ray™, disks typically have one or two data layers on each side. Typical separation distances between data layers are approximately 55 µm for DVDs and 25 µm for Blu-ray Discs™. The maximal displacement of the focus actuator for these systems are in the tens to hundreds micrometer range since optical elements need only move between two data layers for reading or recording. However, in single-bit holographic data storage technology, a relatively large number of data layers 60 (e.g., 10-50 layers) are configured throughout the thickness of the disk, enabling increased data storage capacities. Storage mediums may also have increased data density within each data layer 60.

Therefore, to read from or record to each data layer of a disk 12, optical components may be configured to actuate over a relatively large displacement range across all the data layers and configured to focus on a relatively small data position with relatively high accuracy and precision. For example, assuming a 25 GB data layer capacity, a 1 TB disk may employ 40 data layers across the thickness of a 1.2 mm thick disk, with a maximal axial focusing error of approximately 45 nm. To read and record on such disks, an actuator would have a relatively large dynamic range to achieve both long travel distance and high precision. Such characteristics are generally challenging for actuators used in conventional optical disk storage systems. Actuating optical components over a relatively large number of data layers 60 and focusing a reading beam to a relatively small target data position using a single stage actuator may result in tradeoffs between displacement range and position accuracy, as each involve different and sometimes conflicting considerations in actuator design and implementation. Furthermore, such techniques may also affect the efficiency and economics of the holographic recording system in terms of data searching time due to longer actuator settling time and system cost due to more complex actuator and servo design. Traditional optical disk storage systems may not be suitable for actuating over large displacement ranges needed for holographic disk while maintaining accurate focusing and an acceptable processing speed.

In one or more embodiments, a holographic recording system may include a multi-stage actuator 26 having a cross-layer displacement component 25 and a intra-layer displacement component 27, also referred to as a focusing component 27 (FIG. 1). While embodiments described herein focus on the focusing actuator 26 and vertical displacement, it should be noted that some embodiments may also be implemented with the tracking actuator 31 for multi-receiver coil assembly 12-stage horizontal displacement.

The cross-layer displacement component 25 may actuate optical components over a displacement range corresponding to the distance across all the layers 60 of a disk 12, or the thickness of a disk 12. For example, the cross-layer displacement component 25 may displace optical components of the optical system 62 in displacement increments in a range of approximately 10 μm to 1 mm. The intra-layer component 27 may actuate optical components for finer displacement within a data layer 60. For example, such finer displacement may be in a range of approximately 10 nm to 100 μm, and may focus a beam on a target data position with relatively high precision. By decoupling the conventional one-stage actuation technique used for both layer displacement and focusing, the present techniques using different stages for layer displacement and fine focusing may read and/or record over a relatively large displacement range while accurately focusing on a relatively small data position. In addition, the design of the cross-layer actuation component 25 and the intra-layer actuation component 27 may be conducted independently so that the overall actuation accuracy and precision can be decoupled and targeted in separate stages. By using multiple actuation stages, each with similar and moderate dynamic range but different travel distances, not only may each actuator stage be implemented with less complexity, but relatively large overall travel distance and dynamic range may also be achieved.

For example, the present techniques may be used to read and/or record over the layers of a holographic disk 12 while maintaining accuracy. A typical holographic disk 12 may have 40 data layers 60 separated by a distance δ and a thickness of approximately 1.2 mm. A cross-layer displacement component 25 may displace optical components to position a beam roughly on a target data layer 60, and an intra-layer displacement component 27 may have a maximum focus range set to a distance of two times the layer distance δ, or 2δ. By setting the maximum focus range to 2δ, the focus range is approximately 60 μm. Using a typical 12-bit digital-to-analog converter (DAC) for the focusing component, the resolution of the focusing component 27 may be approximately 14.6 nm, which may be smaller than the typical error limit of 45 nm. Therefore, a multi-stage actuator 26 may read and/or record over multiple data layers 60 while maintaining accuracy.

Moreover, when continuously accessing data in the same layer, the cross-layer actuation component 25 can be locked or adjusted only slightly while the intra-layer actuation component 27 moves to compensate focusing errors generated from sources such as disk rotation, wobbling, vibration, etc. Thus the intra-layer actuation component 27 can be designed to have high precision and fast speed in a relatively small travel range compared with the entire disk thickness. Compared with using single stage actuator for both cross-layer and intra-layer displacement, such techniques may not require adjustment of the fine position (e.g., 10 s nm range) in reference to the total travel distance (1-2 mm range), which can increase time consumption and complexity of the servo system construction.

In some embodiments, the multi-stage actuator 26 may have separate mechanisms for the cross-layer displacement component 25 and the intra-layer component 27. For example, the cross-layer displacement component 25 may involve servo-mechanical components suitable for actuating an objective lens 64 for cross-layer displacement of a beam, such that the beam is positioned (focused or not yet focused, at this stage) on a target data layer 60. The intra-layer component 27 may involve separate servo-mechanical components suitable for actuating an objective lens for intra-layer displacement of the beam, such that the beam is focused on a target data position. Furthermore, the multi-stage actuator 26 may involve more than two stages. In some embodiments, in addition to a coarse stage for cross-layer displacement and a fine stage for intra-layer focusing, a multi-stage actuator 26 may also include an intermediate stage. For example, the intermediate stage may be used to actuate one or more optical components to move a beam for smaller layer displacement movements (e.g., moving within 1-10 data layers 60) while the coarse stage actuates to move a beam for larger layer displacement movements (e.g., moving across more than 10 data layers 60). Moreover, layer displacement movements may be further divided into additional stages. For example, a multi-stage actuator 26 may have a first component for actuating optical components across a range of 20 or more layers, a second component for actuating optical components across a range of 10-20 layers, a third component for actuating optical components across a range of less than 10 layers, and one or more additional components for different levels of intra-layer focusing.

Each stage may involve different servo-mechanical devices suitable for different actuation mechanisms such as electromagnetic actuation, electrostatic actuation, piezoelectric actuation, thermal actuation, etc. The multi-stage actuator 26 may also use a voice coil actuation system having two sets of coils, where one set may be used for cross-layer displacement, and one set may be used for intra-layer movement (e.g., displacement across layers and focusing within a target layer, respectively). One example of a multi-stage actuator 26 having two sets of voice coils is provided in FIG. 5. As illustrated in the three-dimensional diagram, a multi-stage actuator 26*a* may have a first voice coil 72 for actuating one or more optical components (e.g., the objective lens 64) such that a beam is positioned close to a target data layer 60 of a disk 12. The multi-stage actuator 26*a* may also include a second voice coil 74 for actuating one or more optical components such that the beam is focused on a target data position in the target data layer 60. A cross-sectional side view of the two coils in the multi-stage actuator 26*a* is provided in FIG. 6.

Figure 5:
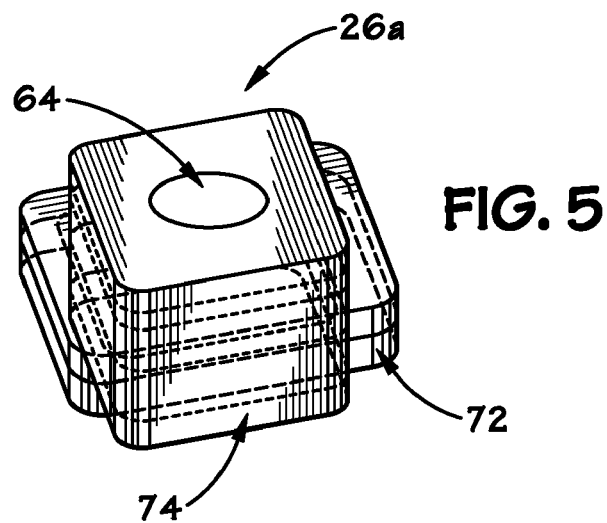
FIG. 5 is a three-dimensional diagram of an optical system having a multi-stage actuator, in accordance with embodiments.
Figure 6:
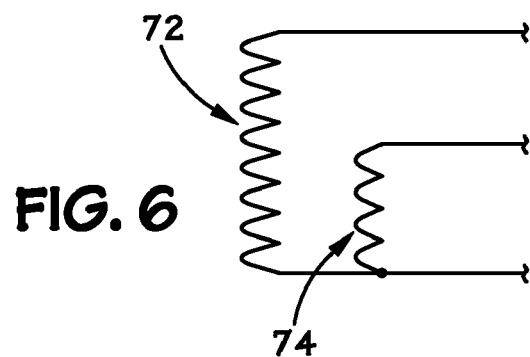
FIG. 6 is a cross-sectional side view of two coils in a multi-stage actuator, in accordance with embodiments.

Though two voice coil actuators are depicted in FIGS. 5 and 6, in different embodiments, different types and combinations of actuators may be used in a multi-stage actuator 26. For example, in some embodiments, a voice coil may be used for cross-layer displacement while a piezoelectric actuator is used for intra-layer focusing. In some embodiments, two or more piezoelectric actuators may be used to tilt one or more optical components (e.g., objective lens 64). Such embodiments may be used to compensate for potential wobbling or imperfections of the disk 12 which may result in tilting or displacement of the target data position and/or the target data layer 60.

Figure 7:
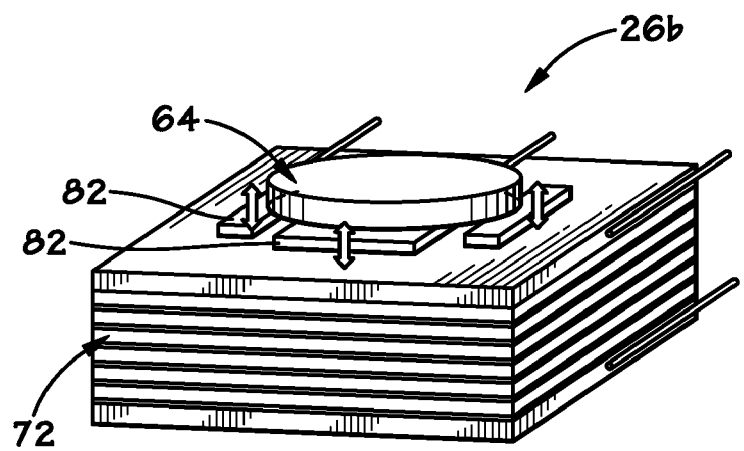
FIG. 7 is an illustration of an optical system having a multi-stage actuator, in accordance with embodiments.

An illustration of an optical system having a multi-stage actuator 26*b* suitable for layer displacement, focusing, and tilting actuation is provided in FIG. 7. The multi-actuator system 80 may include a voice coil 72 for layer displacement and multiple piezoelectric actuators 82 for actuating the objective lens 64 to focus and/or tilt to accurately impinge a beam on a target data position on a target data layer 60.

In different embodiments, the different components of the multi-stage actuator 26 may be activated serially or simultaneously. For example, the cross-layer displacement component(s) 25 may first actuate one or more optical components to impinge the beam on a target data layer 60 of the disk 12. Once the target data layer 60 is impinged, the intra-focusing component(s) 27 may actuate and/or tilt the same or different optical components to focus the beam on a target data position with relatively high precision. In some embodiments, the different components of the multi-stage actuator 26 may be activated simultaneously. For example, the cross-layer displacement component(s) 25 and the intra-layer focusing and/or tilting component(s) 27 may actuate simultaneously, which may result in further time saving during the reading and/or recording process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of focusing a beam to a holographic disk, the method comprising:
   determining a target data position on a target data layer in the holographic disk;
   actuating one or more optical components using a first component of a multi-stage actuator, wherein the first component is configured to actuate the one or more optical components to change a focus depth of a beam in a displacement range corresponding to a thickness of data layers in the holographic disk, such that the beam is impinged on the target data layer; and
   actuating one or more optical components using a second component of the multi-stage actuator, wherein the second component is configured to actuate the one or more optical components to focus the beam on the target data position, and wherein actuating the one or more optical components using the second component comprises actuating the one or more optical components in a tilting motion.

2. The method of claim 1, wherein actuating the one or more optical components using the first component comprises actuating the one or more optical components in increments corresponding to a thickness of one data layer in the holographic disk.

3. The method of claim 2, wherein the increment is approximately 10 µm to approximately 1 mm.

4. The method of claim 1, wherein the displacement range is approximately 1 mm to approximately 2 mm.

5. The method of claim 1, wherein actuating the one or more optical components using the first component comprises using two or more sub-components, each configured to actuate the one or more optical components in different increments.

6. The method of claim 1, wherein actuating the one or more optical components using the second component comprises focusing within approximately 45 nm.

7. The method of claim 1, wherein actuating the one or more optical components using the second component comprises using two or more piezoelectric actuators.

8. A method of focusing a beam to a holographic disk, the method comprising:
   determining a target data position on a target data layer in the holographic disk;
   actuating one or more optical components using a first component of a multi-stage actuator, wherein the first component is configured to actuate the one or more optical components to change a focus depth of a beam in a displacement range corresponding to a thickness of data layers in the holographic disk, such that the beam is impinged on the target data layer; and
   actuating one or more optical components using a second component of the multi-stage actuator, wherein the second component is configured to actuate the one or more optical components to focus the beam on the target data position, and wherein actuating the one or more optical components using the second component comprises setting a focus range to approximately two times a distance between adjacent data layers of the holographic disk.

9. The method of claim 8, wherein actuating the one or more optical components using the first component and actuating the one or more optical components using the second component are performed substantially simultaneously.

10. An optical head for holographic disk reading and recording, the optical head comprising:
    one or more optical components, wherein the optical head is configured to impinge a beam on a target data position in a target data layer of a holographic disk; and
    a multi-stage focus actuator comprising:
      a cross-layer component configured to actuate at least one of the one or more optical components to change a focus depth of the beam in a displacement range corresponding to a total thickness of a plurality of data layers in the holographic disk to impinge the beam on the target data layer; and
      an intra-layer component configured to actuate at least one of the one or more optical components to focus the beam on the target data position, wherein the intra-layer component is configured to actuate the one or more optical components in a tilting motion.

11. The system of claim 10, wherein the cross-layer component comprises one or more of an electromagnetic actuator, an electrostatic actuator, a thermal actuator, and a piezoelectric actuator.

12. The system of claim 10, wherein the cross-layer component comprises two or more sub-components, wherein each of the sub-components is configured to actuate the one or more components in different increments.

13. The system of claim 12, wherein the two or more sub-components comprise two or more voice coils.

14. The system of claim 10, wherein the intra-layer component comprises one or more of an electromagnetic actuator, an electrostatic actuator, a thermal actuator, and a piezoelectric actuator.

15. An optical head for holographic disk reading and recording, the optical head comprising:
    one or more optical components, wherein the optical head is configured to impinge a beam on a target data position in a target data layer of a holographic disk; and
    a multi-stage focus actuator comprising:
      a cross-layer component configured to actuate at least one of the one or more optical components to change a focus depth of the beam in a displacement range corresponding to a total thickness of a plurality of data layers in the holographic disk to impinge the beam on the target data layer; and
      an intra-layer component configured to actuate at least one of the one or more optical components to focus the beam on the target data position, wherein the intra-layer component comprises two or more sub-components configured to tilt the one or more optical components.

16. The system of claim 15, wherein the two or more sub-components comprises two or more piezoelectric actuators.

17. An optical head for holographic disk reading and recording, the optical head comprising:
    one or more optical components, wherein the optical head is configured to impinge a beam on a target data position in a target data layer of a holographic disk; and
    a multi-stage focus actuator comprising:

a cross-layer component configured to actuate at least one of the one or more optical components to change a focus depth of the beam in a displacement range corresponding to a total thickness of a plurality of data layers in the holographic disk to impinge the beam on the target data layer; and an intra-layer component configured to actuate at least one of the one or more optical components to focus the beam on the target data position, wherein the intra-layer component is configured to actuate the one or more optical components to focus the beam in a focus range of approximately two times a distance between adjacent data layers of the plurality of data layers.

18. A system, comprising:

a multi-stage actuator comprising:

a cross-layer displacement component configured to actuate one or more optical components in an optical head in a first displacement range, to impinge the beam on a data layer of a disk; and an intra-layer focusing component configured to actuate the one or more optical components in a second displacement range to focus the beam on a data position in the data layer, wherein the first displacement range is larger than the second displacement range, and wherein the intra-layer focusing component comprises two or more piezoelectric actuators configured to actuate the one or more optical components in a tilting motion.

19. The system of claim 18, wherein the cross-layer displacement component and the intra-layer focusing component comprises two or more of an electromagnetic actuator, an electrostatic actuator, a thermal actuator, and a piezoelectric actuator.

20. The system of claim 18, wherein the first displacement range is approximately 1 mm to approximately 2 mm.

21. The system of claim 18, wherein the cross-layer displacement component is configured to actuate the one or more optical components in increments of approximately 10 μm or greater.

22. The system of claim 18, wherein the second displacement range is approximately 10 μm or less.

23. A system, comprising:

a multi-stage actuator comprising:

a cross-layer displacement component configured to actuate one or more optical components in an optical head in a first displacement range, to impinge the beam on a data layer of a disk; and an intra-layer focusing component configured to actuate the one or more optical components in a second displacement range to focus the beam on a data position in the data layer, wherein the first displacement range is larger than the second displacement range, and wherein the cross-layer displacement component and the intra-layer focusing component are configured to actuate the one or more optical components substantially simultaneously.

* * * * *